Nov. 24, 1942.     C. M. EASON     2,303,201
CLUTCH
Filed Sept. 4, 1940     2 Sheets-Sheet 1
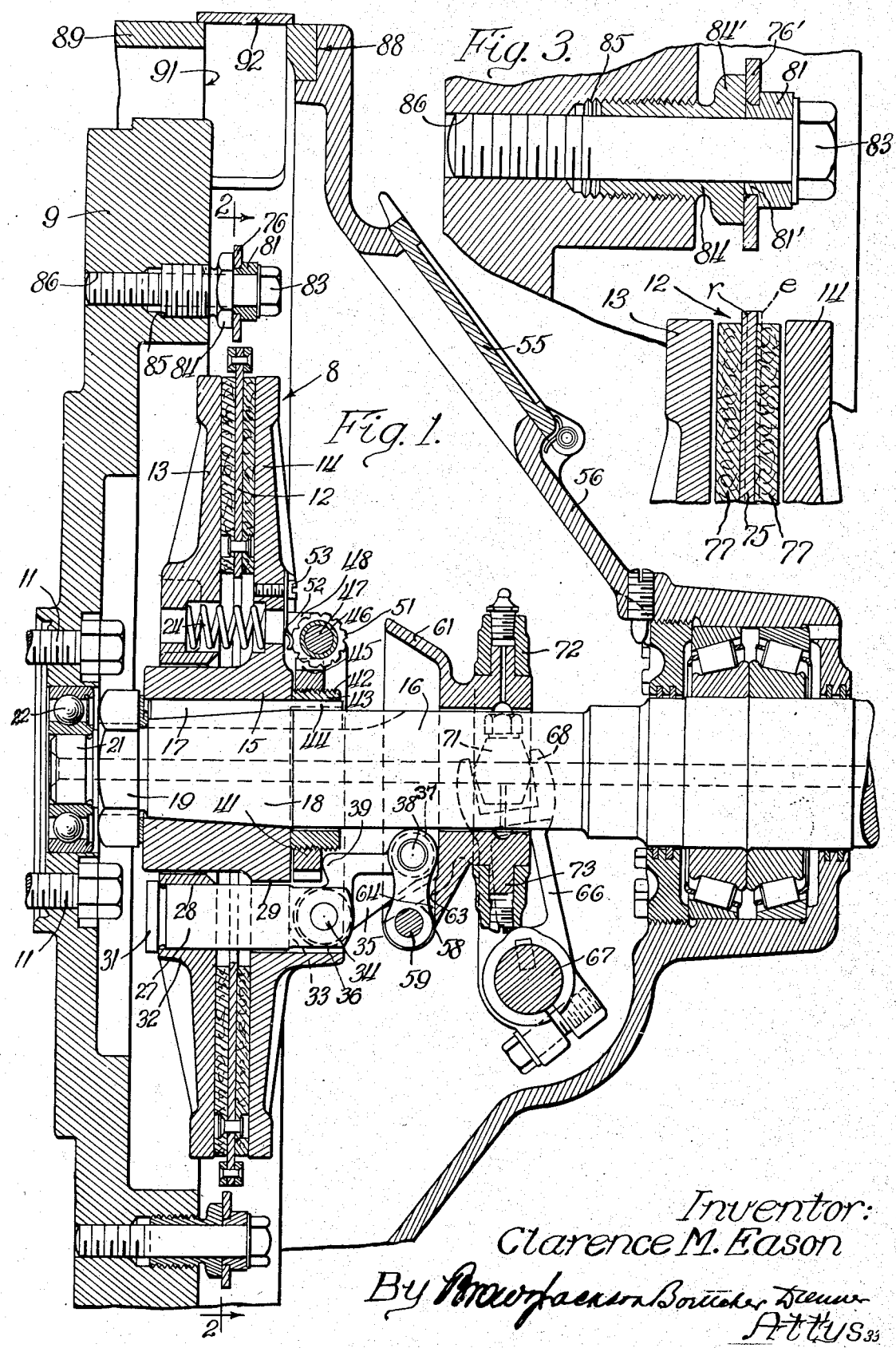
Inventor:
Clarence M. Eason Nov. 24, 1942.  C. M. EASON  2,303,201
CLUTCH
Filed Sept. 4, 1940   2 Sheets-Sheet 2
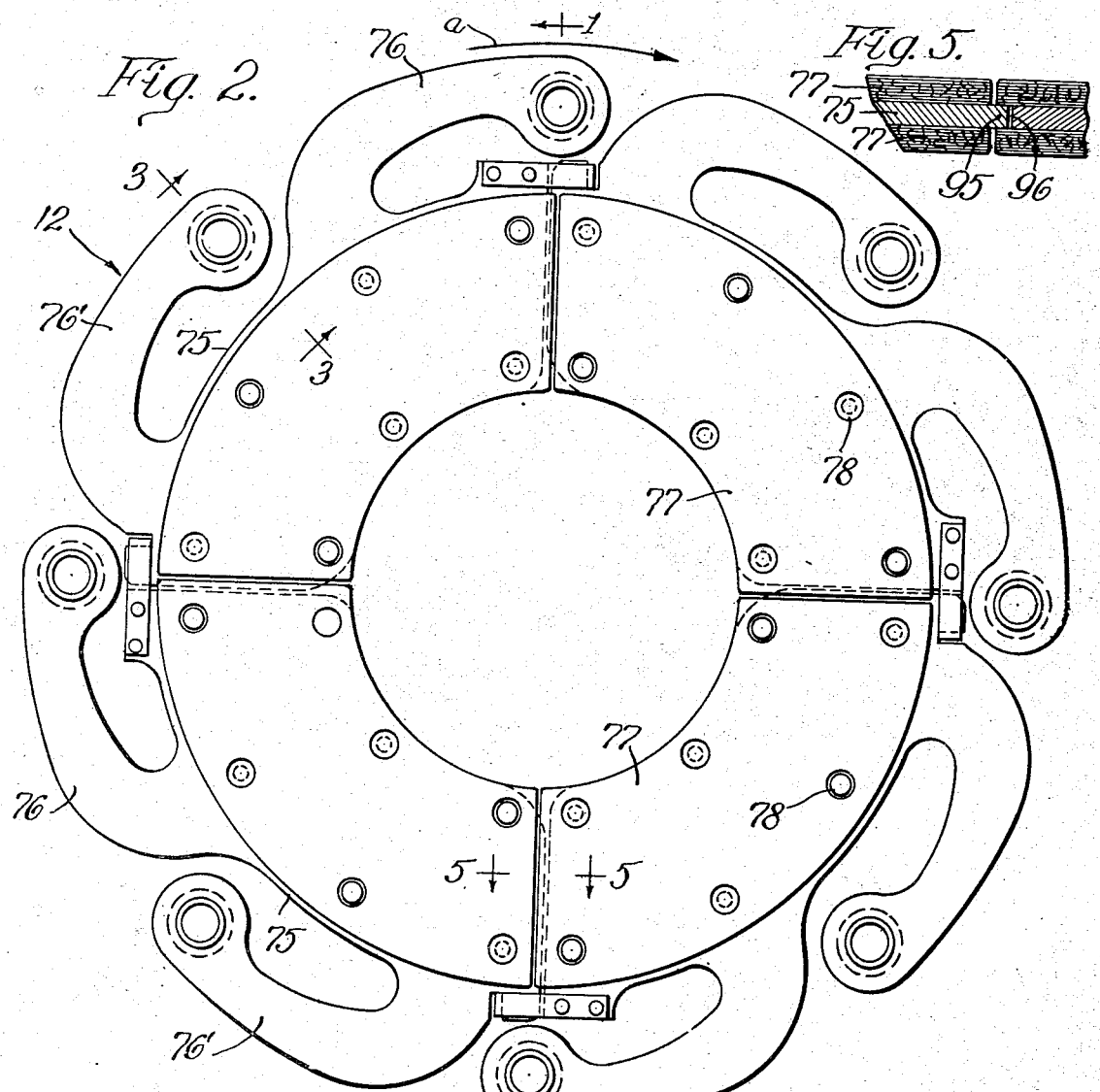
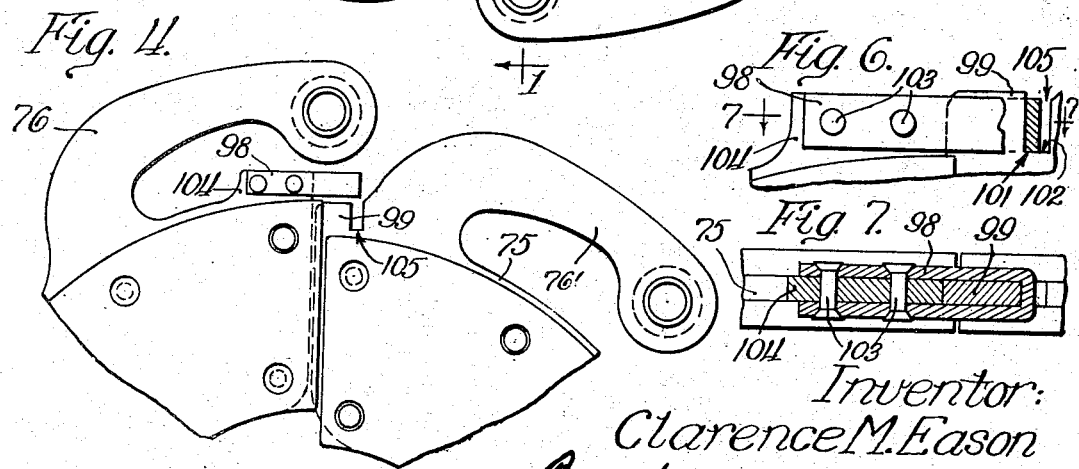
Inventor:
Clarence M. Eason
By
Attys Patented Nov. 24, 1942

2,303,201

UNITED STATES PATENT OFFICE 2,303,201

CLUTCH

Clarence M. Eason, Waukesha, Wis.

Application September 4, 1940, Serial No. 355,331

18 Claims. (Cl. 192—68)

The present invention relates to friction clutches of the disc or plate type used for controlling the transmission of power from a driving member to a driven member. The present invention embodies improvements over the constructions disclosed in my prior Patent No. 2,177,362 issued October 24, 1939, and in my prior Patent No. 2,259,461 issued October 21, 1941.

More particularly, the present invention is concerned with clutches having a clutch disc which is flexibly mounted and flexibly connected so as to provide for free shifting movement of the disc in the engaging and releasing of the clutch, and also to accommodate a relatively large degree of misalignment between the clutch parts. This is accomplished through a unique relation of flexible attaching arms extending from the periphery of the clutch disc and adapted to have bolted or other attachment at their ends to the driving or driven part of the clutch. These arms preferably extend in a generally circumferential direction from the periphery of the clutch disc, and afford a very flexible mounting and driving relation for the disc, whereby the disc can be readily shifted in the engaging and releasing of the clutch and deflected laterally for accommodating misalignment between the clutch parts.

In the early form of my invention disclosed in my prior Patent No. 2,177,362, the friction gripping portion or the disc portion proper was first constructed as a one-piece continuous ring. In such one-piece construction, the torque stresses acting at any one point in the disc were always distributed to all other points in the disc, so that no one portion of the disc tended to become twisted or distorted radially inwardly or outwardly relatively to any other portion of the disc.

In the later form of my invention illustrated in my aforementioned prior Patent No. 2,259,461, I departed from the earlier one-piece construction and divided the clutch disc into a plurality of segmental sections, which segmental construction has the advantages of affording even a greater degree of lateral flexibility, and also of enabling the clutch disc to be readily removed in sections out through the periphery of the clutch assembly whenever it is desired to reface the friction material on the disc, or to make any adjustments or repairs. In the segmental construction herein shown, there are preferably four segments, and each segment preferably has two circumferentially directed arms extending therefrom for receiving the attaching bolts, although this exact construction is not essential.

However, I have found that in this segmental construction, the various load stresses, such being the torque stress primarily and the centrifugal stress secondarily, tend to twist or cock the segments in a radial direction relatively to each other or relatively to the circular continuity of the disc in its entirety. That is to say, the torque load establishes a rotative component in each segment tending to rotate the segment in a radial plane approximately around the centers of the mounting bolts which pass through the ends of the attaching arms. This rotative component tends to cause the trailing end of each segment to be forced radially outwardly, and also tends to cause an objectionable separation between the edges of adjacent sections. These forces result in uneven wear, and may shorten the effective life of the disc. If it is attempted to avoid such difficulties by constructing the segments and their circumferential mounting arms of extremely heavy or stiff stock, then the arms do not have the required flexibility which is so desirable for accommodating misalignment, shifting, etc.

One of the particular objects of the present invention is to avoid the foregoing difficulties by providing an improved arrangement of interlocking means acting between adjacent segments. This interlocking means comprises stop means for resisting the rotative component which tends to twist the trailing ends of the segments outwardly, and also comprises tie means for resisting the spreading forces which tend to separate the segments. This combined form of stop means and tie means establishes a tension sustaining connection between adjoining segments which results in a very high degree of hoop strength being given the complete assembly of segments, whereby the assembly is greatly strengthened against separating stresses, centrifugal stresses, etc. My improved tie and stop connection effectively prevents the uneven wear referred to above, while still permitting the segments to be conveniently removed radially out through the periphery of the clutch assembly when it is desired to reface the friction material, etc.

Another feature of the invention resides in an improved joint which is formed between the adjoining edges of adjacent segments. This improved joint keeps the segments in an accurate edge-to-edge relation, to prevent fore or aft displacement of one segment relatively to another, while still leaving the segments free to slide substantially radially relatively to each other, for accommodating the edgewise removal of the segments out from the periphery of the clutch assembly. In the preferred embodiment of this feature, the joint is of the tongue and groove variety, wherein one radial edge of each segment forms the tongue, and wherein the friction linings are arranged to project from the other radial edge to form the groove, the latter receiving the tongue of the next adjoining segment.

Another feature of the invention resides in an improved adjustable mounting means to which are secured the flexible arms extending circumferentially from the segments. This improved mounting means greatly facilitates the making of fore and aft adjustments of the anchoring points for the ends of the flexible arms, such adjustments enabling the segmental disc to be accurately positioned fore and aft between the front and rear clutch plates which engage the front and rear sides of the segmental disc. The original assembly of the clutch is decidedly simplified by the provision of such adjustable mounting means.

These and other features and objects of the invention will appear from the following detail description of one preferred embodiment thereof. In the accompanying drawings illustrating such embodiment:

Figure 1 is an anxial sectional view taken approximately on the plane of the line 1—1 of Figure 2, showing my improved clutch embodied in a power take-off unit;

Figure 2 is a front elevational view of the clutch disc showing the various segments in their normal operating relation, this view corresponding to a section taken approximately on the plane of the line 2—2 of Figure 1;

Figure 3 is a detail sectional view on a larger scale of one of the adjustable mounting sleeves and cap screws which secure the flexible arms of the disc segments to the flywheel, this view being taken on the plane of the line 3—3 of Figure 2;

Figure 4 is a fragmentary elevational view showing one of the disc segments being displaced outwardly in a more or less radial direction, such representing the manner of separately removing the segments from the clutch assembly;

Figure 5 is a transverse detail sectional view taken approximately on the plane of the line 5—5 of Figure 2;

Figure 6 is a fragmentary detail view of one of the interlocking mechanisms between adjoining segments; and Figure 7 is a detail sectional view taken approximately on the plane of the line 7—7 of Figure 6.

Referring to Figure 1, the clutch 8 is adapted to be secured to a rotary member 9, which may be either a driving member or a driven member. When the clutch is embodied in a power take-off unit or is otherwise employed to control the transmission of power from an internal combustion engine, the rotary member 9 is preferably the flywheel of the engine, shown as being secured to a flange on the engine crankshaft by the bolts or screws 11. In such embodiments of the invention, the segmental disc above referred to constitutes the driving element of the clutch, the same being designated 12. The driven portion of the clutch comprises the front and rear clutch plates 13 and 14, which are adapted to be contracted together against the front and rear sides of the driving disc 12. The rear or outer clutch plate 14 is formed integral with a hub 15 which is keyed to the front end of the driven shaft 16. The keyed relation of the hub 15 on the shaft 16 is secured by a longitudinal key 17 and also by a wedge fit of the hub 15 over the tapered portion 18 of the shaft, such wedge fit being effected by a nut 19 which screws over a threaded forward portion of the shaft. The front extremity 21 of the shaft has pilot mounting in a pilot bearing 22 carried within a bore formed in the hub of the flywheel 9.

The front or inner clutch plate 13 of the driven pair 13—14 is mounted for sliding movement toward and away from the outer clutch plate 14. A plurality of compression springs 24 which are seated in pockets in the opposing faces of the clutch plates at angularly spaced points around the clutch tend normally to shift the inner clutch plate 13 to an inward, clutch-releasing position. The clutch is engaged through the instrumentality of a plurality of pull pins 27 which are disposed at angularly spaced points around the clutch assembly. These pull pins slide in aligned guide apertures 28 and 29 formed in the clutch plates 13 and 14, respectively, and the inner end of each pull pin is formed with an enlarged head 31 which abuts against the inner end of a guide boss 32 projecting inwardly from the clutch plate 13. The opposite or outer end of each pull pin is slotted transversely, as indicated at 33, and extending across said slot is a pivot pin 34. Pivotally mounted in each slot 33 on the pin 34 is the apertured inner or forward end 36 of a toggle rocker 35. It will be understood that there is one of these toggle rockers 35 for each pull pin 27. The opposite or outer end of each toggle rocker has an apertured eye 37 for receiving a knuckle pin 38. Intermediate these apertured inner and outer ends, the toggle rocker is formed with an abutment shoulder or fulcrum 39 which is adapted to have rocker bearing engagement against an adjustable abutment ring 41. Said ring 41 has an internally threaded bore which screws over an adjusting thread 42 formed externally on a ring 43.

The ring 43 is held against rotation relatively to the driven clutch elements by an extension 44 of the key 17. A plurality of worm wheel teeth 45 are cut around the outer periphery of the abutment ring 41, and meshing with these teeth is a short adjusting worm 46 which is rotatably mounted on a short bearing shaft 47. The ends of the shaft 47 are mounted in two lugs 48 disposed relatively close together and projecting rearwardly from the driven clutch plate 14. Rotating with the worm 46 is a notched wheel 51, into the notches of which snaps a detent spring 52 which is secured to the driven clutch plate 14 by the screw 53. It will be evident that rotation of the notched wheel 51 will rotate the worm 46 and thus revolve the abutment ring 41 either forwardly or backwardly along the thread 42 of the inner ring 43, thereby adjusting the axial location of the inner surface of said ring 41, against which the fulcrum shoulders 39 of the toggle rockers bear. Convenient access to the above-described adjusting mechanism is made available through a hinged cover 55 which is hingedly mounted on the clutch housing 56.

The knuckle pin 38 at the rear end of each toggle rocker 35 establishes pivotal connection with the upper or inner end of a toggle link 58. The outer end of each toggle link has pivotal mounting on a pivot pin 59 carried by the shiftable clutch operating collar 61. The forward portion of this clutch collar is of generally tapering section, and formed at angularly spaced points in this tapered flange portion are radial slots 63 for receiving the toggle links 58. Pairs of radially projecting lugs or ears 64 extend outwardly on each side of each slot 63 for receiving the transverse pivot pins 59 on which the toggle links 58 are mounted. Shifting motion is imparted to the clutch collar 61 through a shifter fork 66 which is mounted on a transverse operating shaft 67, and which is formed with notched fork arms 68 that embrace shifter lugs 71 projecting laterally from a shifter ring 72. This ring is a diametrically split ring, which has its two halves bolted together over a radial flange 73 projecting from the shifter collar 61.

In the operation of this clutch actuating mechanism, it will be evident that when the knuckle pivots 38 of the three or more toggle assemblies employed are oscillated in an inward direction toward the axis of the shaft 16, such motion of the toggle rockers 35 creates a rocker motion about the fulcrum points 39, which causes the pivots 34 to pull the pull pins 27 outwardly or rearwardly for engaging the clutch. Such inward oscillation of the knuckle pivots 38 is effected by the shifting motion of the shifter collar 61 in a direction toward the clutch assembly. To release the clutch, the shifter collar 61 is shifted outwardly, in a direction away from the clutch assembly, with the result that the knuckle pivots 38 are permitted to oscillate outwardly in a direction away from the axis of the shaft 16. This takes the heavy rocking pressure off the fulcrum points 39, permitting the pull pins 27 to shift inwardly or forwardly under the energy of the release springs 27, in consequence of which the clutch assumes a released position. It will be noted that the knuckle pins 38 can be oscillated inwardly to a position which disposes them either in or slightly beyond a position of dead center alignment with the outer pivots 59, in which dead center or over center relation the clutch will remain engaged without the necessity of having to maintain the engaging pressure on the manual control which operates the actuating shaft 67. When it is desired to adjust the clutch to compensate for wear of the clutch lining, or to advance or retard the time of clutch engagement relatively to the motion of the control pedal or control handle, it is only necessary to open the spring cover 55 and to rotate the serrated wheel 51 for shifting the fulcrum ring 41 backwardly or forwardly.

Referring now to the construction of the segmental disc 12, it will be seen from Figure 2 that the disc is made up of a plurality of segments 75, from which project the circumferentially extending flexible arms 76, 76'. The direction of rotation is represented as being clockwise (see arrow $a$ in Figure 2), and when the disc 12 is the driving element the arms or fingers 76, 76' extend forwardly in the direction of rotation, so that the driving torque always places these arms under tension. In the preferred construction illustrated, the disc is divided into four segments, and each segment is provided with two arms or fingers, consisting of a leading arm 76 and a trailing arm 76', although this specific number of segments and number of arms is not essential. Secured to the front and rear sides of each disc segment are the arcuate pieces of clutch lining material 77, the attachment being effected by rivets or screws 78 in conventional manner.

Each segment 75 and its integral mounting arms 76, 76' is preferably stamped out of sheet metal stock, such as a suitable steel of the appropriate composition, temper and gauge as to enable the mounting arms to flex the required amount for engaging and releasing the clutch, and accommodating misalignment. It is preferred that the grain of the metal run substantially in the same direction in each of the two resilient arms or fingers 76, 76', and to this end the successive stampings can all be punched out in end-to-end relation from strip stock of a width substantially equal to the width of each stamping. This is fully disclosed in my prior Patent No. 2,259,461, and attention is also directed thereto for a description of the advantages attained by shaping the fingers 76, 76' with the particular outline illustrated in Figure 2. The outer end of each flexible mounting finger or arm is apertured to receive a bolting thimble or bushing 81. As shown in Figure 3, each bolting thimble or bushing is formed with a reduced inner end 81' which is passed through the aperture in the mounting finger and is then peened over to rivet the thimble to the finger.

The improved adjustable mounting means for mounting the apertured outer end of each of these flexible mounting fingers comprises a cap screw 83 and a threaded sleeve 84, as clearly shown in Figure 3. One of these assemblies is provided for the outer end of each finger 76, 76'. The threaded shank portion of the sleeve 84 screws into a tapped bore 85 formed in the flywheel 9. The cap screw 83 passes through the thimble 81 and through the sleeve 84 and taps into a threaded bore 86 of smaller diameter, extending coextensively from the inner end of the threaded bore 85. The sleeve 84 is formed with an enlarged head portion 84' which serves as an adjustable mounting stop for determining the position of the apertured end of each mounting finger 76, 76'. The periphery of the enlarged head 84' is of hexagonal formation to receive a wrench by which the sleeve 84 can be screwed inwardly or outwardly in the bore 85 to adjust the fore and aft position of the abutment head 84'. The stop sleeve 84 is rigidly held in any position to which it has been adjusted upon the tightening of the cap screw 83, which exerts a binding force on the sleeve 84 for locking the latter in its adjusted position. Figure 3 illustrates two positions of the disc segment 75, the rear full-line position $r$ representing the released position of the clutch disc, and the front dotted-line position $e$ representing the engaged position of the clutch disc. By adjusting the mounting sleeves 84 inwardly or outwardly, these positions $r$ and $e$ can be displaced forwardly or rearwardly with respect to the driven clutch discs 13 and 14, thereby adjusting for wear of the clutch linings 77, or adjusting for throw of the clutch control member. In the preferred construction illustrated, the released position $r$ of each segment 75 coincides with the transverse plane of the anchored outer ends of the fingers 76, 76', although, if desired, these fingers might be given a set so that the released position $r$ of the segment would be displaced forwardly from the transverse plane of the ends of the fingers as far as the engaged position $e$ would be displaced rearwardly from said plane. In the assembly of the clutch, all eight stop sleeves 84 are adjusted to dispose their stop surfaces in the same transverse plane. This is easily accomplished by extending a gauge bar diametrically across the rear edge 88 of the flywheel housing 89 (Figure 1), this gauge bar having a calibrated stop against which the sleeves 84 are adjusted as the gauge bar is revolved around the edge of the flywheel housing. An arcuate opening 91 is formed in the upper part of the flywheel housing 89, this opening being normally closed by any suitable cover 92. Access can readily be gained to the cap screws 83 and stop sleeves 84 through this opening 91 whenever it is desired to adjust the clutch for wear of the clutch linings.

Referring now to the tongue and groove joints which are provided at the adjoining edges of each pair of segments, it will be seen from Figure 5 that the trailing edge of each segment extends beyond the corresponding edges of the clutch lining 77, thereby forming a projecting central tongue 95; also, that at the leading edge of each segment the edge of the segment itself is set back from the corresponding edges of the clutch linings 77, thereby forming a central groove 96, for receiving the tongue 95 of the adjoining segment. It will be evident that this tongue and groove joint 95, 96 will hold the edges of adjoining segments against any substantial displacement in a lateral or axial direction. Each tongue and groove joint extends along a radial line, or along a line slightly offset from a radius but parallel thereto, such a radial line being represented by the section plane 1—1 of Figure 2. Hence, any two segments can be slid substantially radially with respect to the other two segments in the operation of removing the segments from the clutch assembly, as I shall presently describe.

Referring now to the improved interlocking means which establishes an interlocked relation between the adjoining disc segments, while still permitting the segments to be removed peripherally from the clutch assembly, this interlocking means includes a circumferential lock in the form of a loop or tie link 98 carried by each disc segment and adapted to hook down over a lug 99 carried by the next segment; and said interlocking means also includes a radial lock in the form of an outer abutment shoulder 101 carried by each segment and adapted to overlie and confine an inner abutment shoulder 102 carried by the next segment.

The tie link 98 of the circumferential lock is in the form of a U-shaped stamping which has its side portions rigidly anchored by rivets 103 to a lug 104 projecting outwardly from each segment adjacent to the leading edge of the segment. The tie loop 98 extends substantially circumferentially from the lug 104 in the direction of rotation, and is disposed directly inside of the bolted end of the mounting finger 76 of that particular segment. The loop end of each of these tie links is adapted to slip down over the hook lug 99 which is formed integral with the next segment. This hook lug is in the form of a radially extending projection formed integral with each disc segment adjacent to its trailing edge, the forward edge of said lug being defined by the slot 105 into which the forward end of the strap loop 98 hooks. The slot 105 is preferably milled to provide a close accuracy of fit of the parts. It will be evident that the hooked engagement of the tie link 98 over the lug 99 provides a tension resisting connection between adjacent segments which has very large hoop strength for resisting all spreading or separating stresses between the segments. At the same time, the tie link is free to slide radially outwardly off the end of the hook lug 99 in the operation of removing the disc segments, as shown in Figure 4.

Referring now to the radial locks 101, 102, the outer abutment shoulder 101 is formed on the inner surface of the tie link 98 at the outer extremity thereof. This shoulder overlies the inner abutment shoulder 102 on the next adjoining segment, said inner shoulder being formed at the inner end of the milled slot 105 (Figure 5). By virtue of this radial lock 101, 102, any rotative stress tending to cock or twist one of the segments in a radial plane is transmitted on to the next segment, whereby these stresses are confined and resisted within the circular series of segments. As heretofore remarked, the load torque transmitted through the clutch establishes a rotative component in each disc segment tending to swing the segment backwardly around the centers of the mounting bolts 83 or around a virtual pivot therebetween. This rotative component tends to swing the trailing edge of each segment in an outward direction in the plane of rotation of the disc. However, it will be evident that such outward force at the trailing edge of the segment presses the inner abutment shoulder 102 outwardly against the outer abutment shoulder 101 so that this outward force is transmitted to the leading edge of the next succeeding segment, whereby the force is resisted by or balanced within the next segment and hence does not strain or distort the flexible fingers 76, 76'.

In removing and replacing the disc segments, the mounting bolts or screws 83 are first removed, access thereto being had thru the hinged cover 55 or down through the upper opening 91. This upper opening 91 is of sufficient angular length to enable the segments to be lifted out through said opening. In the operation of releasing the tie links 98 from the hook lugs 99, two segments are shifted together. For example, the two left-hand segments of Figure 2 would be shifted upwardly as a unit, in the manner shown in Figure 4. This lifts the tie link 98 of the upper left-hand segment off of its respective hook lug 99, and also draws the hook lug 99 of the lower left-hand segment upwardly out of its respective tie link 98. After this pair of segments has been freed in this manner, the two segments of said pair are then separated and withdrawn individually through the opening 91. The other pair of segments is now, of course, to be separated and withdrawn in like manner. The replacing of the segments back between the driven clutch plates 13, 14 is a mere reversal of the operation of removing the segments. The pull pins 27 are preferably limited in number to three to afford that much more central space to accommodate the shifting of the segments in their removal and replacement.

While I have illustrated and described what I regard to be the preferred embodiment of my invention, nevertheless it will be understood that such is merely exemplary, and that numerous modifications and rearrangements may be made therein without departing from the essence of the invention.

I claim:

1. In a clutch adapted to connect two rotary members, the combination of a clutch disc carried by one of said rotary members and adapted to engage a cooperating clutch element carried by the other rotary member, said clutch disc comprising a plurality of segmental sections adapted to be removed from the clutch assembly in separated relation, each of said segments comprising a flexible attaching finger extending therefrom for attachment to one of said rotary members, and interlocking means carried by said segments serving to transmit stresses from one of said segments to another, said interlocking means being slidable into and out of cooperative interlocking engagement.

2. In a clutch adapted to connect two rotary members, the combination of a clutch disc carried by one of said rotary members and adapted to engage a cooperating clutch element carried by the other rotary member, said clutch disc comprising a plurality of segmental sections adapted to be removed from the clutch assembly in separated relation, each of said segments comprising a mounting arm extending outwardly therefrom for attachment to one of said rotary members, and interlocking means establishing a circumferential lock between said segments while still permitting the separation of said segments for removal from the clutch assembly, said interlocking means comprising portions carried by said segments formed for sliding into and out of cooperative interlocking engagement.

3. In a clutch adapted to connect two rotary members, the combination of a clutch disc carried by one of said rotary members and adapted to engage a cooperating clutch element carried by the other rotary member, said clutch disc comprising a plurality of segmental sections adapted to be removed from the clutch assembly in separated relation, each of said segments comprising a flexible attaching arm extending therefrom for attachment to one of said rotary members, and interlocking means establishing a radial lock between said segments while still permitting the separation of said segments for removal from the clutch assembly, said interlocking means comprising cooperating interlocking members carried by their respective segments and movable out of interlocking engagement by predetermined relative movement between said segments.

4. In a clutch adapted to connect two rotary members, the combination of a clutch disc carried by one of said rotary members and adapted to engage a cooperating clutch element carried by the other rotary member, said clutch disc comprising a plurality of segmental sections adapted to be removed from the clutch assembly in separated relation, each of said segments comprising a flexible attaching arm extending from the periphery of the segments, means for attaching said arms to one of said rotary members, and interlocking means establishing a circumferential lock and a radial lock between said segments while still permitting the separation of said segments for removal from the clutch assembly, said interlocking means comprising cooperating interlocking members formed rigidly with their respective segments and movable into and out of interlocking engagement by predetermined relative movement between said segments.

5. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed from the clutch assembly in separated relation, and interlocking means joining said segments against predetermined stresses while permitting predetermined edgewise motion between said segments to effect their separation, said interlocking means comprising cooperating interlocking members constructed as rigid portions of their respective segments and slidable into and out of cooperative interlocking engagement with each other.

6. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed substantially edgewise from the clutch assembly in separated relation, a flexible mounting arm extending from each of said segments and having attachment to one of said rotary members, and interlocking means joining said segments against predetermined relative motion between said segments in one direction while permitting predetermined relative motion between said segments in another direction in order to effect their separation, said interlocking means comprising a first interlocking member rigid with one segment and a second interlocking member rigid with another segment, said two interlocking members being formed so as to be slidable into and out of cooperative interlocking engagement by relative edgewise movement between said segments.

7. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed substantially edgewise from the clutch assembly in separated relation, a flexible mounting arm extending from each of said segments and having attachment to one of said rotary members, and a circumferential lock between each pair of adjacent segments comprising a shoulder member carried by one of said segments and a loop member carried by the other of said segments, said loop member engaging with said shoulder member.

8. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed substantially edgewise in separated relation from the periphery of the clutch assembly, each of said segments comprising a plurality of flexible attaching arms extending in a generally circumferential direction from the periphery of the segments, means for attaching said arms to one of said rotary members, and a circumferential lock between each pair of adjacent segments comprising a hook lug carried by each segment adjacent to its trailing edge, and a U-shaped link carried by each segment adjacent to its leading edge, the U-shaped link of each segment engaging over the hook lug of the next adjacent segment.

9. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed from the clutch assembly in separated relation, and a radial lock between each pair of segments comprising an inner abutment shoulder carried by one of said segments, and an outer abutment shoulder carried by the other of said segments, said outer abutment shoulder overlying said inner abutment shoulder.

10. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed substantially edgewise in separated relation from the periphery of the clutch assembly, a flexible mounting arm extending from each of said segments and having attachment to one of said rotary members, and a radial lock acting between each pair of adjacent segments comprising an inner abutment shoulder carried by each segment adjacent to its trailing edge, and an outer abutment shoulder carried by each segment adjacent to its leading edge, said outer abutment shoulder overlying said inner abutment shoulder and preventing the trailing edges of said segments from being cocked outwardly relatively to the leading edges thereof.

11. In a clutch adapted to transmit rotation from one rotary member to another, the combination of a clutch disc carried by one of said rotary members, and adapted to engage a cooperating clutch element carried by the other rotary member, said clutch disc comprising a plurality of segments adapted to be removed from the clutch assembly in separated relation, a circumferential lock between each pair of adjacent segments comprising a hook member carried by each segment and a loop member carried by each segment, the loop member of each segment engaging over the hook member of the next adjacent segment, and a radial lock between each pair of adjacent segments comprising an inner abutment shoulder carried by one of said segments and an outer abutment shoulder carried by the other of said segments, said outer abutment shoulder carried by the other of said segments, said outer abutment shoulder overlying said inner abutment shoulder.

12. In a clutch adapted to connect two rotary members the combination of a clutch disc carried by one of said rotary members and adapted to engage a cooperating clutch element carried by the other rotary member, said clutch disc comprising a plurality of segmental sections separately removable and replaceable in the clutch assembly, each of said segments comprising a plurality of attaching arms extending in a generally circumferential direction from the periphery of the segment, means for attaching said arms to one of said rotary members, and means establishing a tie connection between the adjoining edges of adjacent segments such as resists circumferential separating forces between the segments and also prevents relative radial movement between adjacent segments when installed in operative relationship.

13. In a clutch adapted to connect two rotary members, the combination of a clutch disc carried by one of said rotary members and adapted to engage a cooperating clutch element carried by the other rotary member, said clutch disc comprising a plurality of segmental sections separately removable and replaceable in the clutch assembly, a plurality of flexible attaching arms for each segment joined at one end to the segments and having their free ends extending in a generally circumferential direction spaced outwardly from the periphery of the segment, means for attaching said free ends to one of said rotary members, and tie means extending between the adjoining edges of adjacent segments and disposed adjacent the peripheries of said segments inside the free ends of adjacent attaching arms, said tie means resisting circumferential separating forces acting between the segments and also preventing relative radial movement between adjacent segments when installed in operative relationship.

14. In a clutch adapted to connect a flywheel and a driven shaft, the combination of a pair of driven clutch plates carried by said driven shaft adjacent the plane of the outer edge of said flywheel, a driving clutch disc disposed between said plates and adapted to be engaged thereby, said clutch disc being formed as a plurality of separately removable arcuate segments having their contiguous or meeting edges extending substantially radially of the disc, a pair of flexible attaching arms for each segment having their inner ends formed integrally with the segments and having their free ends extending in a generally circumferential direction spaced outwardly from the periphery of the segments, bolts securing said free ends to the outer edge of said flywheel, and tie means extending between the adjoining edges of adjacent segments and disposed adjacent the peripheries of said segments inside the free ends of adjacent attaching arms, said tie means increasing the hoop strength of the assembly of segments and also preventing relative radial movement between adjacent segments when installed in operative relationship.

15. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed from the clutch assembly in separated relation, a flexible mounting arm extending from each of said segments and having attachment to one of said rotary members, and tongue and groove joint means formed at the adjoining edges of adjacent sections for holding said edges against relative axial displacement, while permitting predetermined edgewise motion between said segments to effect their separation.

16. In a clutch adapted to transmit rotation from one rotary member to another, the combination of a clutch disc carried by one of said rotary members and adapted to engage a cooperating clutch element carried by the other rotary member, said clutch disc comprising a plurality of segments adapted to be removed substantially edgewise in separated relation from the periphery of the clutch assembly, a flexible mounting arm extending from each of said segments and having attachment to one of said rotary members, interlocking means carried by said segments serving to transmit stresses from one of said segments to another, and joint means associated with said segments for holding the edges of the segments against relative lateral displacement.

17. In a clutch adapted to transmit rotation from one rotary member to another, the combination of a clutch disc revolving with one of said rotary members and adapted to engage a cooperating clutch element revolving with the other of said rotary members, said clutch disc comprising a plurality of attaching arms extending therefrom, and adjustable mounting members carried by one of said rotary members for mounting said attaching arms, said mounting members comprising cooperating threaded sleeves and screws threading into said rotary member to different positions of adjustment and clamping said attaching arms therebetween.

18. In a clutch adapted to transmit rotation from one rotary member to another, the combination of a clutch disc carried by a first rotary member and adapted to engage a cooperating clutch element carried by a second rotary member, said clutch disc comprising a plurality of segments, flexible mounting arms extending from said segments, and adjustable mounting devices for said mounting arms carried by said first rotary member and comprising threaded sleeves screwing into said rotary member for defining adjustable inner stops for said mounting arms, and also comprising screws passing through said sleeves for defining adjustable outer stops for said mounting arms.

CLARENCE M. EASON.